United States Patent Office 3,274,297
Patented Sept. 20, 1966

3,274,297
GRAFT POLYMERS OF VINYL CHLORIDE ON A BACKFORE COPOLYMER OF VINYL ALCOHOL AND VINYL 2,2-DIMETHYLALKANOATE
Hugh J. Hagemeyer, Jr., Alden E. Blood, and Marvin B. Edwards, Longview, Tex., assignors to Eastman Kodak Company, Rochester, N.Y., a corporation of New Jersey
No Drawing. Filed Sept. 12, 1963, Ser. No. 308,374
8 Claims. (Cl. 260—884)

This invention relates to resinous graft copolymers prepared from monomeric vinyl chloride alone or together with a minor proportion of a vinyl 2,2-dimethylalkanoate comonomer, with or without a cross-linking agent, and certain preformed copolymers of vinyl alcohol and vinyl 2,2-dimethylalkanoates that are especially useful for the preparation of strong, elastic, flame resistant fiber, film or sheeting having an exceptional degree of stability to heat, to hydrolysis, to oxidation and to weathering.

Although vinyl chloride polymers have been widely used in commerce, they have not proven entirely satisfactory for certain applications such as in the making of fibers. For example, vinyl chloride homopolymer is insoluble in most solvents and does not melt without decomposition so that its processability is extremely poor. For this reason, together with relatively poor wearability, vinyl chloride homopolymer does not produce good fiber. Its nonflammability, however, is an important property and, accordingly, various modifications have been proposed to overcome the above mentioned shortcomings and still retain the desirable properties of polyvinyl chloride. Thus, it has been proposed to copolymerize vinyl chloride and cross-linking comonomers with polyvinyl alcohols, for example, with partially hydrolyzed polyvinyl acetate to give the corresponding graft copolymers. While the products have shown improved dyeability and solubility, and some improvements in stability, the fibers produced therewith have been lacking in strength and still are not entirely satisfactory as to stability and melting points. Another drawback is that the polyvinyl alcohols employed in such processes are actually copolymers of vinyl acetate and vinyl alcohol obtained by a so-called controlled hydrolysis of polyvinyl acetate. In practice, it is very difficult to control the extent of the hydrolysis since the hydrolysis tends to zip down a chain as solubility is induced by the initial partial hydrolysis. Thus, the intermediate polyvinyl alcohols are very inexact with respect to alcohol content, especially when preparing copolymers containing either low or high polyvinyl alcohol contents. Accordingly, graft copolymers of the above kind have necessarily been limited to just certain specialized applications.

We have now found that vinyl chloride graft copolymers of markedly improved thermal, oxidative and hydrolytic stability, and with none of the aforementioned drawbacks of related prior art products are obtained by graft copolymerizing vinyl chloride alone or together with a minor proportion of a vinyl 2,2-dimethylalkanoate, with or without a cross-linking comonomer, onto certain highly stable preformed copolymers, i.e. derived copolymers of vinyl alcohol and vinyl 2,2-dimethylalkanoates, in certain specified proportions. Such graft copolymers are readily spun from their melts or solutions into fibers which are strong, elastic, nonflammable, of relatively high melting point, and in addition, show outstanding thermal, oxidative and hydrolytic stability as compared to related prior art products. These graft copolymers also produce superior films and sheeting of excellent strength, flexibility and stability.

It is, accordingly, an object of the invention to provide a new class of markedly improved stability and relatively high melting point resinous vinyl chloride graft copolymers. Another object is to provide superior fibers, films and sheeting from these new graft copolymers. Another object is to provide means for preparing the above compositions and shaped articles. Other objects will become apparent hereinafter.

In accordance with the invention, the new class of resinous vinyl chloride graft copolymers are prepared by copolymerizing a mixture of (1) from 20–50% by weight of monomeric material consisting of (a) vinyl chloride and (b) a mixture of not less than 70% by weight, and preferably from 70–95%, of vinyl chloride and not more than 30% by weight, and preferably from 30–5% of the vinyl ester of a 2,2-dimethylalkanoic acid containing from 5–16 carbon atoms and (2) from 80–50% by weight, of a copolymer consisting of not less than 50% by weight, and preferably from 50–95%, of vinyl alcohol and not more than 50% by weight, and preferably from 50–5%, of the vinyl ester of a 2,2-dimethylalkanoic acid containing from 5–16 carbon atoms until the monomeric material has combined with the preformed copolymer to form the graft copolymer of the invention. A particularly interesting class of graft copolymers are those prepared in the presence of up to about 1%, by weight, preferably about 0.5 to about 1%, by weight, of a cross-linking agent such as divinyl benzene, dialkyl phthalate, alkyl acrylate, triallyl cyanurate, ethylene glycol diacrylate, etc.

The graft copolymerization of the invention can be carried out by any of the well-known polymerization techniques. The reactions are accelerated by heat, by actinic light such as ultraviolet light and by the use of known polymerization catalysts such as the peroxides, e.g. benzoyl peroxide, acetyl peroxide, lauryl peroxide, triacetone peroxide, urea peroxide, t-butyl hydroperoxide, alkyl percarbonates etc., hydrogen peroxide, alkali metal persulfates, e.g. sodium or potassium persulfates, ammonium persulfate, alkali metal perborates, and the like. Other useful polymerization catalysts are boron trifluoride and azo-bis-nitriles. Mixtures of catalysts can be employed.

The quantity of catalyst employed can be varied depending on the reaction medium and other conditions, but ordinarily from about 0.01 to 2% or more, based on the weight of materials to be polymerized, is efficacious.

Advantageously, the polymerizations are carried out under an inert atmosphere, e.g. nitrogen gas, as dispersions in aqueous medium, although in mass polymerizations are also operable. Other reaction media such as organic solvents can be used, for example, hydrocarbons such as benzene, n-heptane, petroleum ether, etc., oxygenated solvents such as acetone, methanol, ethanol, isopropanol, etc., and aqueous solutions of the water-soluble solvents can be used. The term "dispersion" is intended to include both true solutions and emulsions. Suitable emulsifying agents include salts of higher fatty acids, e.g. sodium or potassium stearate, palmitate, etc., ordinary soaps, salts of high fatty alcohol sulfates, e.g. sodium or potassium lauryl sulfate, sodium or potassium stearyl sulfate, etc., salts of aromatic sulfonic acids such as alkylnaphthalene sulfonic acids and the like.

The temperature of polymerization can be varied widely, for example, from about 30–100° C. or more, but preferably from 35–70° C. Atmospheric pressures are preferred, although the process is also operable at pressures substantially above or below normal atmospheric pressures. A continuous polymerization technique can be employed wherein the ingredients are added continuously at a uniform rate and the graft copolymer product is withdrawn as formed from the system in a continuous manner. Advantageously, an activating agent such as an alkali metal bisulfite or metabisulfite, e.g. sodium or potassium bisulfite, can be used in conjunction with the catalyst in approximately equal amount. Chain regulators such as hexyl, octyl, t-dodecyl mercaptans, etc. which impart improved solubility to the resulting graft copolymers can be added.

Stirring, shaking or tumbling of the polymerization reaction mixtures facilitate the polymerizations and produce more uniform products. These can be separated by conventional methods of polymer separation from their reaction mixtures, for example, by addition of saturated salt solutions, such as aqueous saturated lithium chloride or sodium chloride solutions, followed by filtering the precipitated graft copolymer, washing, etc. The compositions of the resulting graft copolymers have been found to be approximately of the same proportions of substituents as were present in the starting polymerization mixtures.

Suitable vinyl alcohol copolymers include those consisting of vinyl alcohol and a vinyl 2,2-dimethylalkanoate such as vinyl 2,2-dimethylbutyrate, vinyl 2,2-dimethylhexanoate, vinyl 2,2-dimethyldecanoate, vinyl 2,2-dimethyldodecanoate and vinyl 2,2-dimethyltetradecanoate, in the specified proportions. These can be readily prepared by copolymerizing the appropriate proportions of an easily hydrolyzable vinyl ester such as vinyl acetate, vinyl propionate, etc. with the vinyl 2,2-dimethylalkanoate and then subjecting the copolymer to hydrolysis until substantially all of the vinyl ester units, for example, vinyl acetate units have been converted to vinyl alcohol units. The vinyl 2,2-dimethylalkanoate units are unaffected by the hydrolysis process. The process is illustrated by the following procedure:

PREPARATION OF VINYL ALCOHOL—VINYL 2,2-DIMETHYLBUTYRATE COPOLYMER

A 3-liter flask equipped with thermowell, stirrer, and reflux condenser was charged with 1 liter toluene, 213 g. vinyl acetate (2.5 moles), 20 g. vinyl 2,2-dimethylbutyrate (0.13 mole), and 1.0 g. benzoyl peroxide. The mixture was heated under nitrogen with stirring at 65° C. for 20 hours. The temperature was lowered to 50° C. and 500 ml. of isopropanol containing 10 g. KOH was added. Stirring was continued at 50° C. for three hours. The toluene and alcohol were removed by steam distillation. The precipitated polymer was washed in water and alcohol and then dried. Infrared showed approximately 15 percent by weight of vinyl 2,2-dimethylbutyrate units and no acetate units (no band at 12.94 $\mu$).

The intermediate vinyl 2,2-dimethylalkanoates including the above vinyl 2,2-dimethylbutyrate can be conveniently prepared by the addition of acetylene to the approximate 2,2-dimethylalkanoic acid in the presence of a catalyst such as mercuric sulfate or mercuric phosphate, at elevated temperatures and pressures. The ester products can be isolated by extraction and distillation at reduced pressures (details Hanford et al., U.S. 2,310,780).

The following examples will serve to illustrate further the manner of practicing our invention.

Example 1

A mixture containing 60 g. of a finely powdered vinyl alcohol-vinyl 2,2-dimethylbutyrate copolymer containing 70 percent polyvinyl alcohol, 40 g. vinyl chloride, 0.6 g. divinylbenzene, 0.6 g. potassium persulfate, 0.5 g. sodium dodecyl sulfate, 0.1 g. dodecyl mercaptan, and 400 ml. water was heated at 60° C. in an autoclave with stirring for 30 hours. The resulting latex was coagulated with aqueous saturated sodium chloride solution, washed and dried. On spinning, fibers were obtained which were strong, elastic, flame resistant, and stable to hydrolysis and light. The tensile strength was 4.6 grams/denier and the extensibility 34.5 percent.

Example 2

The experiment in Example 1 was repeated except that the vinyl chloride was replaced with a mixture consisting of 83 weight percent vinyl chloride and 17 weight percent vinyl 2,2-dimethylbutyrate. The product was spun into fibers as before. Tensile strength was 4.5 grams/denier and extensibility was 30 percent. These fibers also were flame resistant and stable to hydrolysis and light.

Example 3

As already indicated, the graft copolymers of this invention can be prepared without the addition of up to 1% by weight, of cross-linking agent. To illustrate, the procedure of Example 1 is repeated using no divinylbenzene. The resulting graft copolymer, upon spinning, gives strong, elastic, flame resistant fibers which are stable to hydrolysis and light. These fibers have a tensile strength in excess of 4.5 grams/denier and an extensibility of about 35%.

Other generally similar graft copolymers can be prepared by substituting in the above examples, other of the mentioned vinyl 2,2-dimethylalkanoates. Thus, the preformed copolymer may be composed of vinyl alcohol and a different vinyl 2,2-dimethylalkanoate, for example, vinyl 2,2-dimethylhexanoate, or vinyl 2,2-dimethyldecanoate, or vinyl 2,2-dimethyldodecanoate, etc., and the cross-linking agent can be allyl acrylate, diallyl phthalate, etc. Also, the vinyl 2,2-dimethylalkanoate used in conjunction with the vinyl chloride may be any other of the above mentioned members. While the examples have specified only specific proportions of the monomer and copolymer components, it will be understood that any other proportions coming within the limits set forth will also give the improved graft copolymers of the invention.

All of the resinous graft copolymers of the invention can be readily milled, with or without added fillers, pigments, dyes, plasticizers, flow improvers, etc. and most can be blended with various other plastic materials compatible therewith such as vinyl chloride polymers, vinylidene chloride polymers, alkyl acrylate and methacrylate polymers, and the like, and converted to various shaped articles of improved chemical and thermal stability such as sheets, films, etc., that are flexible and tough and useful as wrapping materials and photographic film supports, etc., by the usual compression, extrusion or injection molding techniques or by melt-spinning methods to fibers having improved stability and physical properties. The films and sheets can also be prepared directly from the polymerization reaction mixtures, i.e. without separation of the graft copolymers, by spinning or casting these solutions or emulsions after the polymerization has been terminated. In this case, inert fillers, pigments, dyes, etc. can be added at any stage of the polymerization.

The invention has been described in detail with particular reference to preferred embodiments thereof, but it will be understood that variations and modifications can be effected within the spirit and scope of the invention as described hereinabove and as defined in the appended claims.

What we claim is:

1. A resinous graft copolymer of (1) from 20–50% by weight of monomeric material selected from the group consisting of (a) vinyl chloride and (b) a mixture consisting of at least 70% by weight of vinyl chloride and the remainder of the vinyl ester of a 2,2-dimethylalkanoic acid containing from 5–16 carbon atoms, and (2) from 80–50% by weight of a preformed copolymer consisting of at least 50% by weight of vinyl alcohol and the remainder of the vinyl ester of a 2,2-dimethylalkanoic acid containing from 5–16 carbon atoms.

2. The resinous graft copolymer according to claim 1 wherein the said monomeric material is vinyl chloride and wherein the said copolymer is a copolymer of vinyl alcohol and vinyl 2,2-dimethylbutyrate.

3. The resinous graft copolymer according to claim 1 wherein the said monomeric material is a mixture of vinyl chloride and vinyl 2,2-dimethylbutyrate and wherein the said copolymer is a copolymer of vinyl alcohol and vinyl 2,2-dimethylbutyrate.

4. A resinous graft copolymer of (1) from 20–50% by weight of monomeric material selected from the group consisting of (a) vinyl chloride and (b) a mixture of at least 70% by weight of vinyl chloride and the remainder of the vinyl ester of a 2,2-dimethylalkanoic acid containing from 5–16 carbon atoms, (2) from 80–50% by weight of a preformed copolymer consisting of at least 50% by weight of vinyl alcohol and the remainder of the vinyl ester of a 2,2-dimethylalkanoic acid containing from 5–16 carbon atoms and (3) from 0.5–1.0% by weight of a cross-linking agent selected from the group consisting of divinylbenzene, diallyl phthalate, allyl acrylate, triallyl cyanurate and ethylene glycol diacrylate.

5. The resinous graft copolymer according to claim 4 wherein the said monomeric material is vinyl chloride, wherein the said copolymer is a copolymer of vinyl alcohol and vinyl 2,2-dimethylbutyrate and wherein the said cross-linking agent is divinylbenzene.

6. The resinous graft copolymer according to claim 4 wherein the said monomeric material is vinyl chloride, wherein the said copolymer is a copolymer of vinyl alcohol and vinyl 2,2-dimethylbutyrate and wherein the said cross-linking agent is allyl acrylate.

7. The resinous graft copolymer according to claim 4 wherein the said monomeric material is a mixture of vinyl chloride and vinyl 2,2-dimethylbutyrate, wherein the said copolymer is a copolymer of vinyl alcohol and vinyl 2,2-dimethylbutyrate and wherein the said cross-linking agent is divinylbenzene.

8. A process for preparing a resinous graft copolymer which comprises heating in the presence of a polymerization catalyst an aqueous dispersion comprising (1) from 20–50% by weight of monomeric material selected from the group consisting of (a) vinyl chloride and (b) a mixture consisting of at least 70% by weight of vinyl chloride and the remainder of the vinyl ester of a 2,2-dimethylalkanoic acid containing from 5–16 carbon atoms, and (2) from 80–50% by weight of a preformed copolymer consisting of at least 50% by weight of vinyl alcohol and the remainder of the vinyl ester of a 2,2-dimethylalkanoic acid containing from 5–16 carbon atoms, until the said monomeric material has combined with the said copolymer to form the said graft copolymer.

References Cited by the Examiner

UNITED STATES PATENTS 2,816,087  12/1957  Coover _____ 260—884
2,843,562  7/1958   Caldwell _____ 260—29.6

FOREIGN PATENTS 824,920  12/1959  Great Britain.

MURRAY TILLMAN, *Primary Examiner.*

J. T. GOOLKASIAN, *Assistant Examiner.*